(12) United States Patent
Saito et al.

(10) Patent No.: US 7,938,228 B2
(45) Date of Patent: May 10, 2011

(54) PROCESS FOR PRODUCING SOUND ABSORBER AND PRODUCED BY THE PROCESS, SOUND ABSORBER AND SOUND ABSORBING STRUCTURE

(75) Inventors: Yoshiaki Saito, Ichihara (JP); Minoru Sugawara, Ichihara (JP); Hirofumi Goda, Ichihara (JP); Takeharu Suga, Higashihiroshima (JP); Masaharu Okamura, Higashihiroshima (JP); Toshifumi Sakai, Higashihiroshima (JP)

(73) Assignees: Prime Polymer Co., Ltd., Tokyo (JP); DaikyoNishikawa Corporation, Aki-gun (JP)

( * ) Notice: Subject to any disclaimer, the term of this patent is extended or adjusted under 35 U.S.C. 154(b) by 654 days.

(21) Appl. No.: 11/817,980

(22) PCT Filed: Mar. 7, 2006

(86) PCT No.: PCT/JP2006/304358
§ 371 (c)(1),
(2), (4) Date: Oct. 9, 2007

(87) PCT Pub. No.: WO2006/095727
PCT Pub. Date: Sep. 14, 2006

(65) Prior Publication Data
US 2009/0026010 A1    Jan. 29, 2009

(30) Foreign Application Priority Data
Mar. 7, 2005    (JP) .................. 2005-063171

(51) Int. Cl.
*E04B 1/82* (2006.01)
*E04B 1/84* (2006.01)
*B28B 1/48* (2006.01)
*E04B 1/74* (2006.01)
*B28B 1/00* (2006.01)
*B32B 37/00* (2006.01)

(52) U.S. Cl. ........ 181/290; 181/293; 264/156; 264/45.5
(58) Field of Classification Search .................. 181/290, 181/292, 293, 296; 264/156, 327, 45.5, 154, 264/155, 328.1, 328.14
See application file for complete search history.

(56) References Cited

U.S. PATENT DOCUMENTS

| | | | | |
|---|---|---|---|---|
| 3,074,505 A * | 1/1963 | Schulz | ........................... | 181/290 |
| 3,382,636 A * | 5/1968 | Green | ........................... | 428/138 |
| 3,867,240 A * | 2/1975 | Doerfling | ........................ | 428/71 |
| 5,993,719 A * | 11/1999 | Abe et al. | ....................... | 264/257 |
| 6,334,280 B1 * | 1/2002 | Frappart et al. | .................. | 52/144 |
| 6,439,871 B1 * | 8/2002 | Saito et al. | ..................... | 425/112 |
| 6,454,981 B1 * | 9/2002 | Lee et al. | ....................... | 264/156 |
| 6,818,161 B2 * | 11/2004 | Tokoro et al. | ................. | 264/45.4 |
| 7,318,499 B2 * | 1/2008 | Stevenson et al. | ............ | 181/293 |
| 7,364,014 B2 * | 4/2008 | Goda et al. | ..................... | 181/293 |
| 2002/0054986 A1 * | 5/2002 | Koike et al. | ................. | 428/304.4 |
| 2002/0183399 A1 * | 12/2002 | Kang et al. | ..................... | 514/725 |
| 2005/0093192 A1 * | 5/2005 | Koike et al. | .................. | 264/45.5 |
| 2005/0158536 A1 * | 7/2005 | Tokoro et al. | ............... | 428/316.6 |
| 2005/0252714 A1 * | 11/2005 | Goda et al. | ..................... | 181/252 |
| 2007/0102237 A1 * | 5/2007 | Baig | ............................. | 181/290 |

FOREIGN PATENT DOCUMENTS
JP        7 168577        7/1995
(Continued)

*Primary Examiner* — Edgardo San Martin
(74) *Attorney, Agent, or Firm* — Oblon, Spivak, McClelland, Maier & Neustadt, L.L.P.

(57) ABSTRACT

A process for producing a sound absorber having skin layers constituting front and back surfaces and, interposed between the skin layers, a void layer having a plurality of pin formed holes, each hole having a depth which is enough to penetrate one of the skin layers and is not enough to reach the other skin layer. The sound absorber is formed of a resin material containing 2 to 60 wt % of reinforcing fibers with a length of 2 to 100 mm.

6 Claims, 12 Drawing Sheets

FOREIGN PATENT DOCUMENTS

| | | |
|---|---|---|
| JP | 10 329220 | 12/1998 |
| JP | 2000 52371 | 2/2000 |
| JP | 2002 103492 | 4/2002 |
| JP | 2002 127175 | 5/2002 |
| JP | 2002 160224 | 6/2002 |
| JP | 2003 337588 | 11/2003 |
| JP | 2006243678 A * | 9/2006 |
| JP | 2006272838 A * | 10/2006 |
| JP | 2007233250 A * | 9/2007 |
| JP | 2008231956 A * | 10/2008 |
| JP | 2009056947 A * | 3/2009 |
| WO | 03 091987 | 11/2003 |

* cited by examiner

PROCESS FOR PRODUCING SOUND ABSORBER AND PRODUCED BY THE PROCESS, SOUND ABSORBER AND SOUND ABSORBING STRUCTURE

TECHNICAL FIELD

The invention relates to a process for producing a sound absorber having highly rigid skin layers constituting back and front surfaces and a void layer formed between the skin layers, and a sound absorber produced by the process and a sound absorbing structure.

BACKGROUND

Sound insulators and sound absorbers have heretofore been used to insulate noises. As the sound absorber, it is common to use a soft non-woven fabric or a molded foamed plastic article which absorbs an acoustic wave to a high degree. Such a sound absorber is not rigid and not expected to exhibit sound insulating properties. On the other hand, as the sound insulator, it is common to use a member having high density and high rigidity which hardly vibrates by an acoustic wave. To insulate noises, such a sound insulator insulates an acoustic noise by reflection, not by absorption. Therefore, generally, such a sound insulator is not expected to exhibit sound absorbing properties.

The above-mentioned conventional sound absorber or sound insulator cannot exhibit both sound-absorbing properties and sound-insulating properties. Therefore, in order to provide a member having both sound absorbing and insulating properties, a troublesome process such as laminating a sound absorber and a sound insulator is required, which makes an entire production complicated. If an attempt is made to ensure both sound-absorbing and insulating properties by laminating a sound absorber and a sound insulator, any one of product properties, such as heat resistance, rigidity, light weight, and shape, may be deteriorated. To avoid this, it is required to optimize a material constituting a sound absorber and a sound insulator which are to be laminated, which may result in a time-consuming work of material selection.

Therefore, Patent Document 1 and Patent Document 2 propose a sound absorber using a porous molded article formed of a plurality of foamed resin particles integrated into one piece and a molded article of resin particles having voids communicating with one another. But the sound absorber and the molded article of resin particles described in these documents are a porous molded article having no skin layer. Therefore, these have such disadvantages that they cannot be used suitably in structural bodies due to insufficient strength and are not expected to exhibit sound insulating properties. In addition, the above-mentioned sound absorber and molded article of resin particles also have a disadvantage that it cannot absorb a plurality of frequency bands selectively although they can absorb a single frequency band by controlling the particle size.

In Patent Documents 3 to 5, the applicant of the invention proposes a technique of ensuring both sound absorbing properties and sound insulating properties by using a material having skin layers and a void layer, with one of the skin layers being perforated. These materials are excellent in sound absorbing properties and sound insulating properties. But in this technique, perforation is performed during the post-molding process. To stabilize sound absorbing properties, it is required to remove chips accumulated in holes. In this respect, this technique is not satisfactory in productivity.

Patent Document 1: JP-A-H07-168577
Patent Document 2: JP-A-H10-329220
Patent Document 3: JP-A-2000-52371
Patent Document 4: JP-A-2003-337588
Patent Document 5: WO03/91987

According to application, a sound absorber may require to selectively absorb a sound in a specific frequency band. For example, a car engine sound contains both an uncomfortable noise and a comfortable sound. If an attempt is made to absorb an engine sound using the conventional sound absorber, there is a problem that both an uncomfortable noise and a comfortable sound are absorbed since the conventional sound absorber cannot select an absorbable frequency band. Accordingly, there is a demand for a sound absorber which effectively absorbs an uncomfortable noise and does not absorb a comfortable sound.

The invention has been made in view of the above-mentioned problems, and is directed to provide a process for producing a sound absorber excellent in productivity and quality stability and capable of absorbing only a noise in a specific frequency band, a sound absorber, and a sound absorbing structure.

SUMMARY OF THE INVENTION

To solve the above-mentioned problems, the present invention is a process for producing a sound absorber having skin layers constituting front and back surfaces and, interposed between the skin layers, a void layer having a number of voids, and having a plurality of formed holes each having a depth which is enough to penetrate one of the skin layers and is not enough to reach the other skin layer;
comprising:
providing a mold having a fixed part, a movable part, and at least one pin disposed in such a manner that it can be projected into and retracted from a cavity; and
having a step to cause the pin to project into the cavity during the course of charging the cavity with a resin material and molding the sound absorber and form the holes communicating with the void layer simultaneously with molding of the sound absorber.

According to this process, it is possible to produce a sound absorber efficiently since the holes can be formed simultaneously with molding of the sound absorber. In addition, stable sound absorbing properties can be obtained since removal of chips is unnecessary.

In the invention, it is preferable to use an expansible material as the above-mentioned resin material, and after charging the cavity with the resin material, the resin material in the molten state is caused to expand by retracting the movable part.

This enables integral formation of a void layer exhibiting excellent sound absorbing properties due to the presence of a number of voids and skin layers having high density and high rigidity and exhibiting excellent sound insulating properties.

The invention provides a process for producing a sound absorber, wherein the pin is caused to project into the cavity before, simultaneously with, or after charging the cavity with the resin material, and the pin is caused to retract before, simultaneously with, or after causing the resin material to expand by retracting the movable part, and before causing the skin layer to be formed on the surface of the resin material which is in contact with the outer peripheral surface of the pin.

In this case, in the invention, a means for heating the pin may be provided, and the pin may be caused to retract while heating the outer peripheral surface of the pin at a temperature close to the melting point of the resin material.

According to this process, a hole with no skin layer being formed on the inner peripheral surface and the void layer being exposed entirely on the inner peripheral surface can be formed in the sound absorber. Absorbing properties for a sound in a specific frequency band can be enhanced by forming one or a plurality of such holes on predetermined locations of the sound absorber.

The invention can provide a process for producing a sound absorber, wherein the pin is caused to project into the cavity before, simultaneously with, or after charging the cavity with the resin material, and the pin is caused to retract before, simultaneously with, or after causing the resin material to expand by retracting the movable part, and after causing the skin layer to be formed on at least part of the surface of the resin material which is in contact with the outer peripheral surface of the pin.

In this case, in the invention, it is preferred that the skin layer be formed near the opening of the hole, and the width of the skin layer be within 10 to 60% of the final thickness of the sound absorber.

According to this process, it is possible to provide a sound absorber having a hole in which the skin layer is formed on at least part of the inner peripheral surface thereof. Absorbing properties for a sound in a specific frequency band can be enhanced by forming one or a plurality of such holes on predetermined locations of the sound absorber.

As for the timing of pin projection, the pin may be caused to project before expansion of the resin material by retracting the movable part. Alternatively, the pin may be caused to project simultaneously with or after expansion of the resin material by retracting the movable part.

Accordingly, the invention can provide a process wherein the pin is caused to project into the cavity simultaneously with or after causing the resin material to expand by retracting the movable part after charging the cavity with the resin material.

In the invention, preferably, the pin is caused to project into the cavity when the skin layer is formed, and the pin is pushed into the void layer together with part of the skin layer.

By this, part of the skin layer is pushed into the bottom of the hole. The void layer is crushed by this pushing action, whereby a large space can be formed in the void layer around the hole.

It is preferred that the length of the projected part of the pin be 30 to 90% of the final thickness of the sound absorber.

In the invention, the resin material may contain a fiber-containing thermoplastic resin pellet containing reinforcing fibers with a length of 2 to 100 mm, and the content of the reinforcing fibers may be 2 to 60 wt % of the all resin material.

Using such reinforcing fibers, the so-called "spring-back phenomenon" occurs by retracting the movable part. As a result, the resin material in the molten state in the cavity expands, whereby a number of voids can be generated inside the resin material. Examples of the usable reinforcing fiber include ceramic fibers such as rock wool and poron fibers, inorganic fibers such as glass fibers and carbon fibers, metal fibers such as aluminum fibers and steel fibers, and organic fibers such as ultrahigh-molecular polyethylene fibers, aramide fibers and polyarylate fibers. It is particularly preferable to use glass fibers.

If the length of the reinforcing fiber is shorter than 2 mm, improvement of the strength and sound absorbing properties cannot be attained due to insufficient strength of the reinforcing fiber. If the length of the reinforcing fiber is longer than 100 mm, not only production of the fiber-containing thermoplastic resin pellet becomes difficult, but also the pellet is difficult to handle as a pellet for injection filling. Thereby improvement of the productivity cannot be attained.

If the content of the reinforcing fibers is less than 2 wt % of the all resin material, properties such as damping properties may deteriorate due to insufficient strength or the resin material may hardly expand. On the other hand, if the content of the reinforcing fibers is larger than 60 wt %, molding of the resin materials may become difficult since fluidity lowers due to an excessive amount of reinforcing fibers.

The sound absorber of the invention comprising:
skin layers constituting front and back surfaces;
interposed between the skin layers, a void layer having a number of voids, and having a plurality of formed holes each having a depth which is enough to penetrate one of the skin layers and is not enough to reach the other skin layer, wherein at least one pin disposed in such a manner that it can be projected into and retracted from a cavity is caused to project into the cavity during the course of charging the cavity with a resin material and molding the sound absorber, and the hole communicating with the void layer is formed simultaneously with the molding of the sound absorber.

According to this configuration, since the holes can be formed simultaneously with the molding of the sound absorber, the sound absorber with stabilized quality can be produced with high productivity.

In this case, the sound absorber of the invention may have such a configuration that the pin is caused to retract before the skin layer is formed on the surface of the resin material which is in contact with the outer peripheral surface of the pin, thereby causing the void layer to expose entirely on the inner peripheral surface of the holes.

In the sound absorber of the invention, the pin may be retracted after the skin layer is formed on part of the surface of the resin material which is in contact with the outer peripheral surface of the pin, thereby causing the skin layer to be formed on part of the inner peripheral surface of the hole.

In the sound absorber of the invention, an expansible material may be used as the resin material, and the pin is caused to project after the resin material expands, thereby the hole can be formed.

The sound absorber of the invention can be used, singly or in a suitable combination, in a sound absorbing structural body such as an air cleaner, an air duct, and a resonator for intake and ejection of air.

According to the invention, it is possible to obtain a process of production of a sound absorber excellent in productivity and quality stability and capable of absorbing only a noise in a specific frequency band, a sound absorber, and a sound absorbing structure. Since holes communicating with the internal void layer can be formed simultaneously with the molding, post processing for perforation becomes unnecessary, whereby productivity is improved. Further, the shape or morphology of the hole (presence or non-presence of the skin layer on the inner peripheral surface of the hole, or the width of the skin layer and so on) can be suitably selected or combined, thereby enabling selective absorption of targeted specific and multiple frequency ranges. In addition, due to the presence of dense skin layers, it is possible to obtain a sound absorber exhibiting sound insulating properties.

BEST MODE FOR CARRYING OUT THE INVENTION

Figure 1:
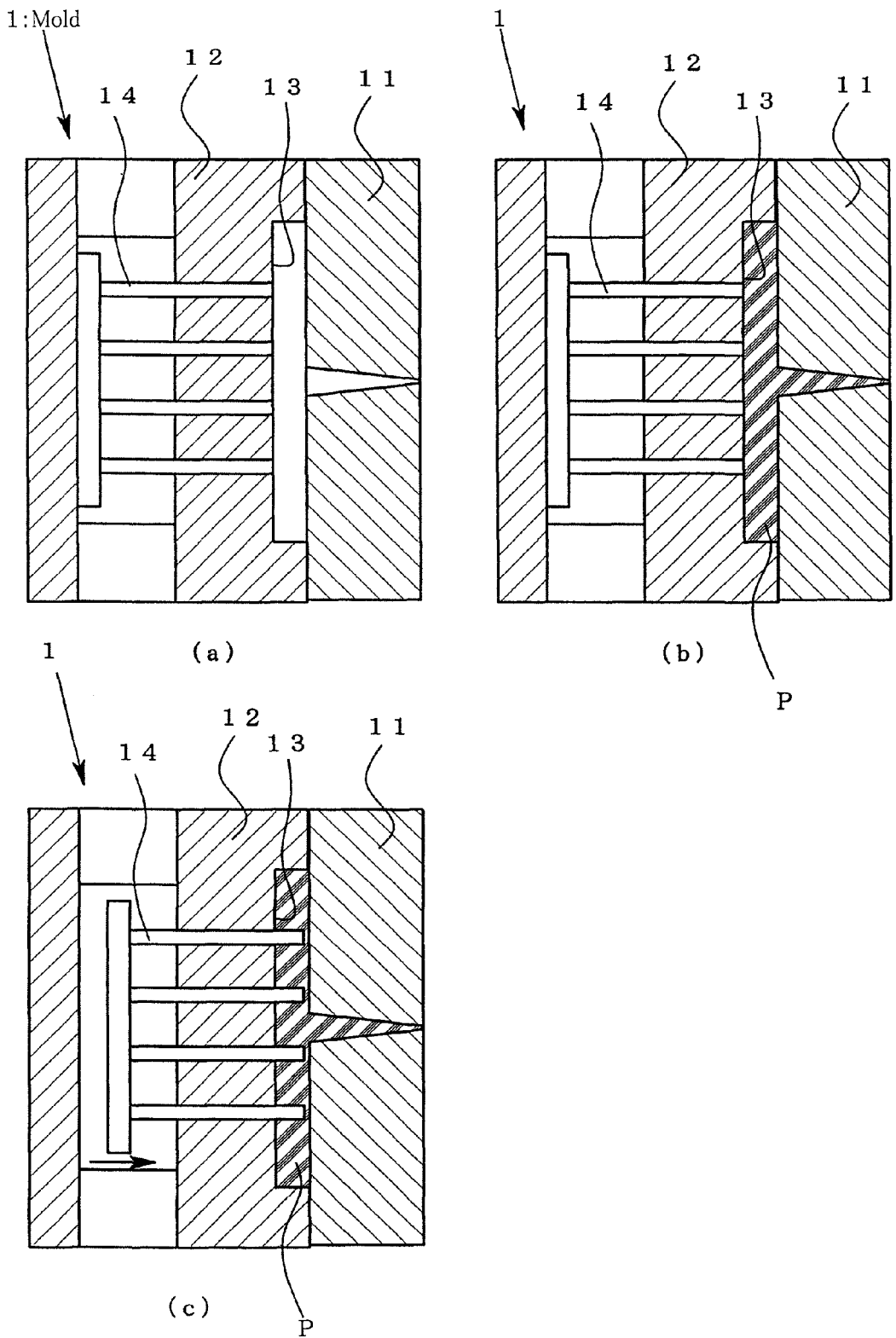
FIG. 1 is a schematic view showing one embodiment of a process for producing a sound absorber of the invention.

The preferred embodiment of the invention will be described in detail referring to the drawings.

FIG. 1 is a schematic view showing the configuration and function of a mold used in producing the sound absorber of the invention. The basic configuration of this mold is known from the above-mentioned Patent Documents 3, 4, 5, or the like.

As the basic configuration, a mold 1 is composed of a fixed part 11, a movable part 12, a cavity 13 formed in the movable part 12, and a driving mechanism to cause the movable part 12 to advance to or retract from the fixed part 11.

The mold 1 of this embodiment has a plurality of pins 14 which are provided in the movable part 12 in such a manner that they can be projected into or retracted from the cavity 13. The shape of the tip of the pin 14 can be selected arbitrarily from a circle, an ellipse, a polygon, a cone, or the like. The driving mechanism for the pin 14 may be one which is provided with a hydraulic cylinder, a motor, or the like as a driving source. No particular restrictions are imposed on the driving mechanism insofar as it can drive the pin with arbitral timing during the molding process. For example, the same driving mechanism as that used for a known ejector pin utilized for forced ejection of a molded article may be used. The driving source may be provided either in the mold 1 or in a molding machine which supplies a resin material in the molten state to the mold 1.

As the resin material, thermoplastic materials may be used. Examples of the thermoplastic materials include polyolefin resins such as polypropylene, a polypropylene-ethylene block copolymer, a propylene-ethylene random copolymer and polyethylene, a polystyrene resin, an acrylonitrile-butadiene-styrene (ABS) resin, a polyvinyl chloride resin, a polyamide resin, a polyester resin, a polyacetal resin, a polycarbonate resin, a polyaromatic ether or thioether resin, a polyaromatic ester resin, a polysulfonic resin, and an acrylate resin.

In order to impart impact strength, a thermoplastic elastomer such as an ethylene-propylene rubber (EPR), an ethylene-butene copolymer elastomer (EBR), a styrene-ethylene-butyrene-styrene block copolymer (SEBS) may be used in combination.

These thermoplastic materials may be used either singly or in combination of two or more.

Of these thermoplastic resins, a Polypropyrene resin such as a polypropyrene, a block copolymer of propylene with other olefins, a random copolymer of propylene with other olefins, or a mixture thereof is preferable. In particular, a polypropyrene resin containing an acid-modified polyolefin resin modified with an acid such as an unsaturated carboxylic acid or its derivative is preferable.

To enhance expansibility after injecting into the cavity 13, it is preferred that a gas such as a nitrogen gas be dissolved or mixed in the thermoplastic material. A foaming agent such as a gas generating agent may be added. In particular, it is desirable to dissolve or mix a supercritical fluid. The supercritical fluid changes from the supercritical state to the normal gas state by reducing pressure. During such a change of state, the volume increases to form voids. Therefore, a void layer can be formed without using a common chemical foaming agent.

Further, a reinforcing fiber may be contained in the thermoplastic material. Examples of the usable reinforcing fiber include ceramic fibers such as rock wool and poron fibers; inorganic fibers such as glass fibers and carbon fibers; metal fibers such as aluminum fibers and steel fibers; and organic fibers such as ultrahigh-molecular polyethylene fibers, aramid fibers and polyarylate fibers. It is particularly preferable to use glass fibers. The length of the reinforcing fibers may preferably be within a range of 2 to 100 mm, and the content of the fibers in the all resin material may preferably be within a range of 2 to 60 wt %.

If the length of the reinforcing fiber is shorter than 2 mm, the strength of the reinforcing fiber cannot be attained sufficiently. As a result, an increase in strength and improvement in sound absorbing properties cannot be attained. If the length of the reinforcing fiber exceeds 100 mm, not only production of a fiber-containing thermoplastic resin pellet becomes difficult, but also the pellet becomes difficult to handle as a pellet for injection filling, making improvement in productivity impossible.

If the content of the reinforcing fibers is smaller than 2 wt % of the amount of the all resin material, sufficient strength cannot be obtained, properties such as damping properties may deteriorate, and the resin material may hardly expand. On the other hand, if the content of the reinforcing fibers is larger than 60 wt %, the resin materials are difficult to be molded since fluidity deteriorates due to an excessive amount of the reinforcing fibers.

Talc, calcium carbonate, barium sulfate, clay, mica, or the like may be used as other inorganic fillers. They may be used either singly or in combination.

As the method for melt kneading and injecting the resin material, the following methods can be used. One method is that a resin material as the raw material is sent to the heating cylinder of a molding machine, where the resin material is molten by heating. Then, the fibers or the like are dispersed, and the resultant resin material is supplied to the tip of an injection molding machine and injected using a plunger or the like. Another method is that a resin material is sent to the heating cylinder, where the resin material is molten by heating. Then, the melted resin material is supplied to a screw part of the injection molding machine by a plunger or the like, and the fibers or the like are dispersed. Then, the resultant resin material is injected. Still another method is that a resin is sent to the tip part of the injection molding machine and inject-molded using a plunger or the like using a screw with a deep groove and a small compression ratio and keeping the cylinder temperature or the like at a significantly high temperature, while suppressing fiber breakage.

Examples of the injection molding method as referred to herein include common injection molding, injection compression molding, injection expansion molding, and injection pressing.

In this embodiment, the resin material is melt-kneaded, the molten resin is injected into a mold which is closed to have a volume smaller than the volume of a final molded article, and the mold is opened before or after the completion of injection to a volume equal to the volume of an intended final molded article so as to expand the resin material, whereby a molded article (sound absorber) is produced. The initial closing degree or the final opening degree of the mold in this case can be determined appropriately based on the content of glass fiber in the resin material, the length of the fiber, the void rate (specific gravity of a molded article) of the intended molded article, and so on. Timing of opening the mold can be determined considering the temperature of the mold, the thickness of the skin layer on the surface of the molded article, and the thickness of the molded article or the like.

First Embodiment Of Production Process

As shown in FIG. 1(a), the movable part 12 is moved toward the fixed part 1 to perform clamping.

After clamping, the resin material P is injected into the cavity 13, as shown in FIG. 1(b).

Subsequently, as shown in FIG. 1(c), the pin 14 is advanced immediately after injection to cause the pin 14 to project into the cavity 13.

The length of the projected part of the pin 14 may be a length which is enough to penetrate one of the skin layers and is not enough to reach the other skin layer. Preferably, the length of the projected part of the pin 14 is adjusted in advance such that the length becomes 30 to 90% of the thickness of a final molded article (sound absorber). Alternatively, changing the length of the projected part of the pin 14 may preferably be synchronized with retraction of the movable part 12.

Figure 2:
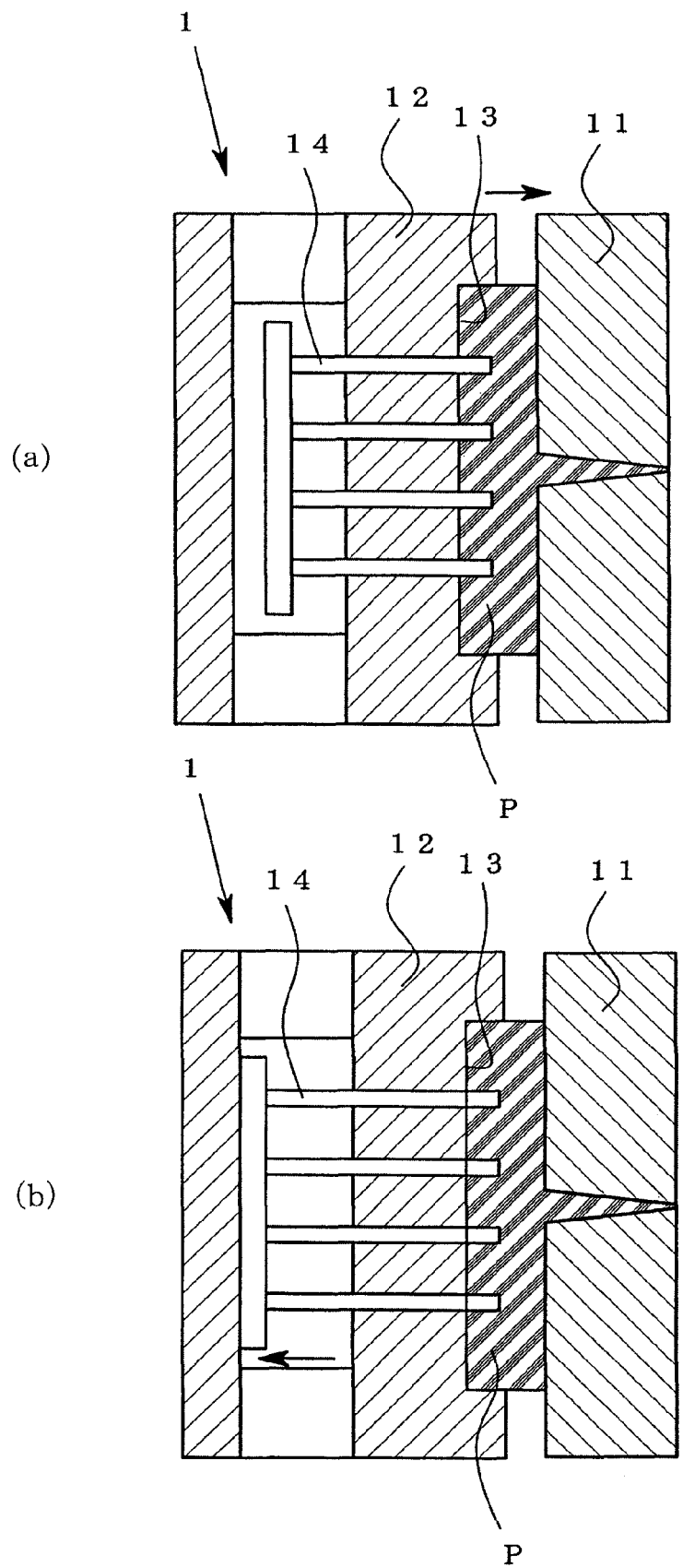
FIG. 2 is a schematic view showing one embodiment of a process for producing a sound absorber of the invention, which is continued from FIG. 1.

Subsequently, as shown in FIG. 2(a), the resin material P is caused to expand while opening the mold slightly. Preferably, the resin material expands by approximately 1.2 to 3.0 times.

Finally, as shown in FIG. 2(b), the pin 14 is caused to retract. After solidification of the resin material P in the cavity 13, the mold is opened to remove the molded article (sound absorber).

In this first embodiment, as for the timing of retracting the pin 14, the pin 14 is caused to retract before the resin material P, which is in contact with the outer peripheral surface of the pin 14, is solidified and the skin layer is formed on the inner peripheral surface of the hole of the resin material P. Therefore, in this embodiment, it is preferable to provide a heater which heats the tip portion of the pin 14 to a temperature close to the melting point of the resin material P in order to suppress solidification of the resin material P which is in contact with the outer peripheral surface of the pin 14.

Figure 3:
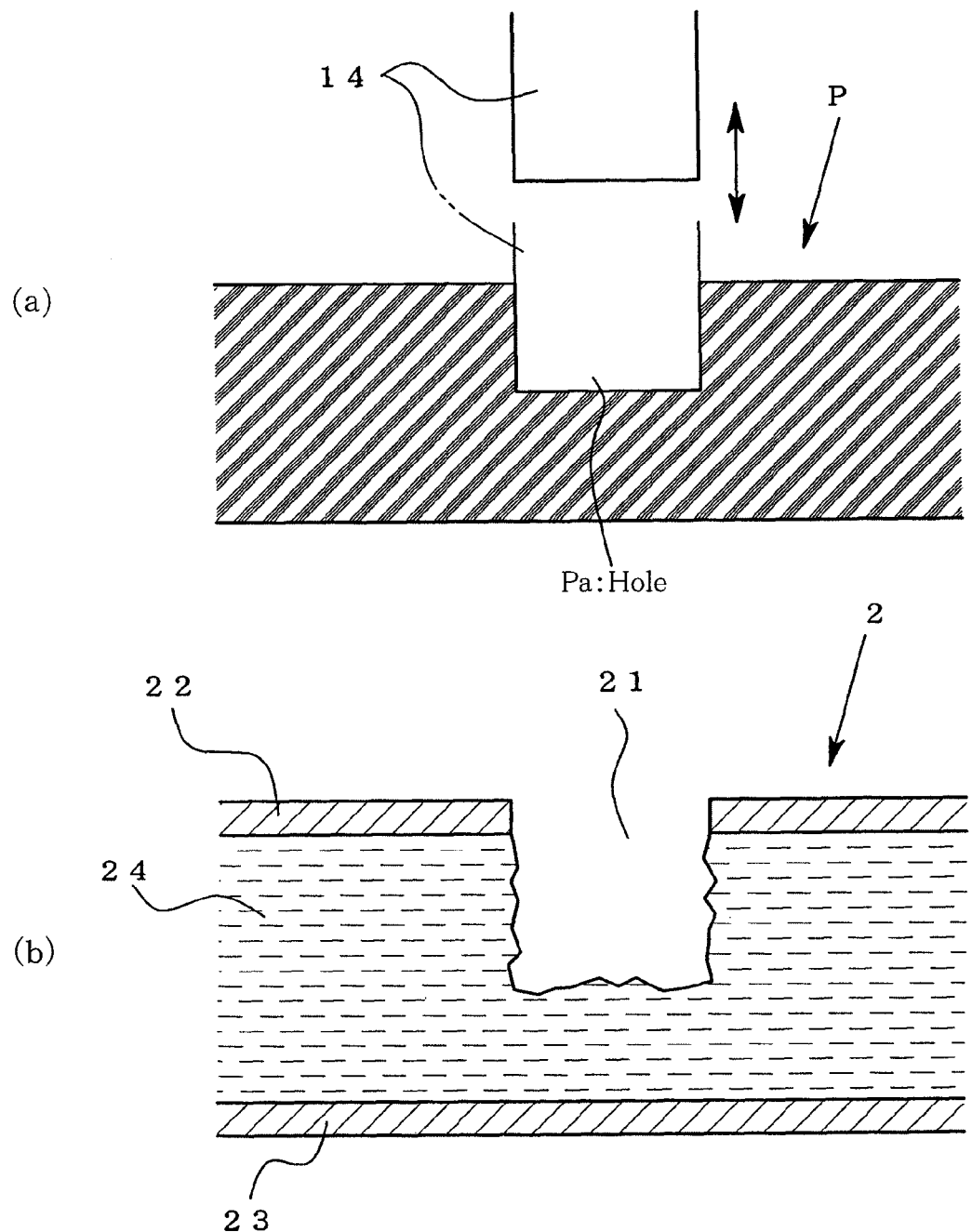
FIG. 3 is a view showing a manner in which a sound absorber is formed according to the process in the first embodiment.

FIG. 3 is an explanatory view showing the manner in which the sound absorber is formed by the process according to the first embodiment. FIG. 3(a) is an enlarged cross-sectional view of the hole part before expansion, and FIG. 3(b) is an enlarged cross-sectional view of the hole part of a molded sound absorber.

As shown, in the first embodiment, the pin 14 is caused to project before retracting the movable part 12 to cause the resin material P to expand. Thus a hole Pa is formed in the resin material P in the molten state. But the pin 14 is removed from the resin material P before the inner peripheral surface of the hole Pa is cooled by the pin 14 to cause a skin layer to be formed. As a result, the void layer 24 is exposed entirely on the inner peripheral surface of the hole 21 of a sound absorber 2 which is obtained by expansion, cooling and solidification of the resin material P. In FIG. 3, numerals 22 and 23 denote skin layers formed on front and back surfaces of the sound absorber 2. The thickness to obtain optimum sound absorbing and insulating properties is about 0.5 to 2.0 mm.

Second Embodiment Of Production Process

The procedures for molding a sound absorber in this embodiment are basically the same as the procedures for molding in the first embodiment as shown in FIGS. 1(a) to 1(c) and in FIGS. 2(a) and (b). In this embodiment, timing of retraction of the pin 14 shown in FIG. 2(b) is different from that in the first embodiment.

Specifically in this embodiment, the pin 14 is caused to retract when at least part of the inner peripheral surface of the hole of the resin material P which is in contact with the outer peripheral surface of the pin 14 is solidified to cause the skin layer to be formed.

Figure 4:
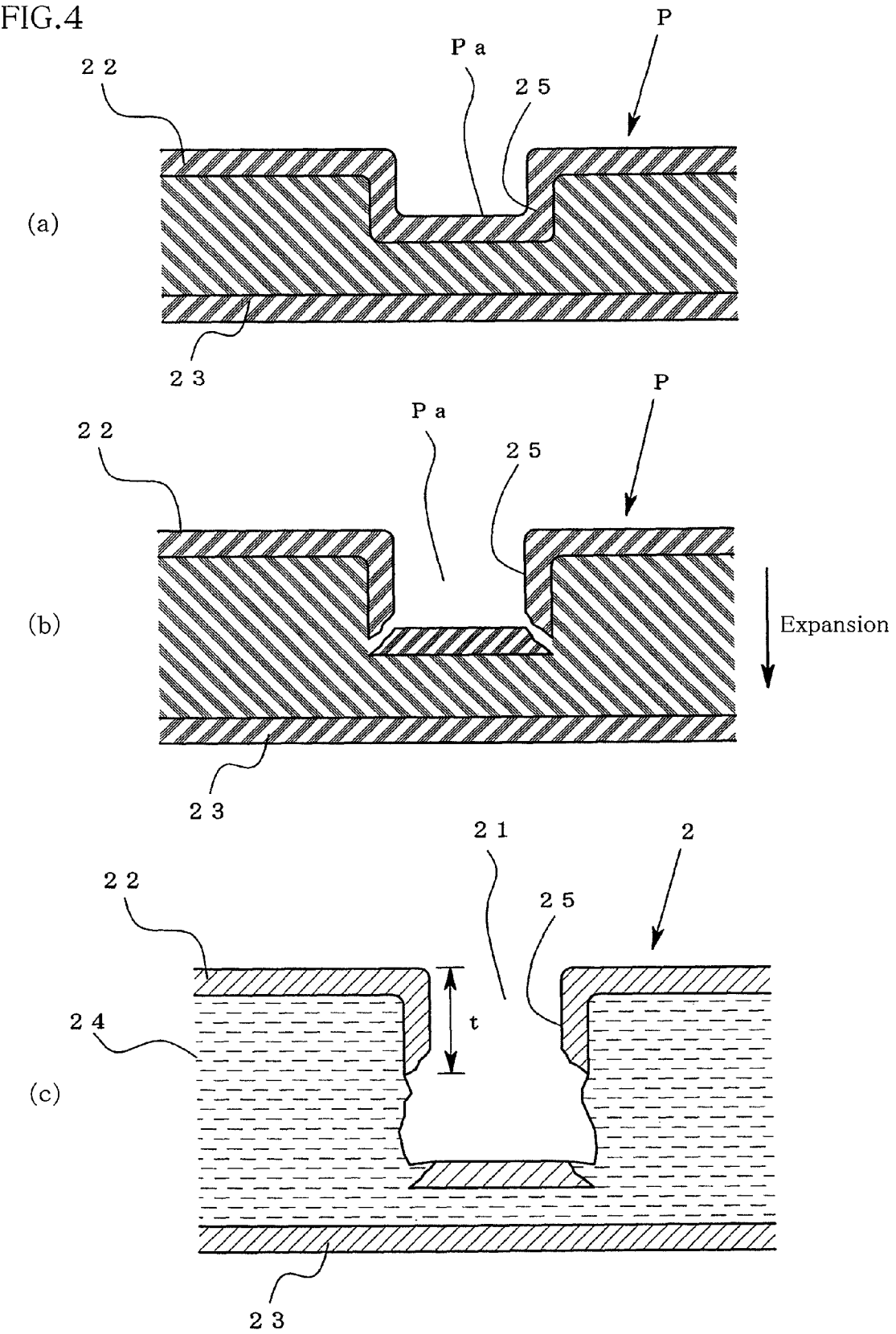
FIG. 4 is a view showing a manner in which a sound absorber is formed according to the process in the second embodiment.

FIG. 4 is a schematic view showing the manner in which a sound absorber is formed in the second embodiment. FIG. 4(a) is an enlarged cross-sectional view of the hole of the resin material before expansion. FIG. 4(b) is an enlarged cross-sectional view of the hole part of the resin material immediately after the start of expansion. FIG. 4(c) is a cross-sectional view of the hole part of the molded sound absorber.

In the second embodiment, as in the case of the first embodiment, the pin 14 is caused to project to form a hole Pa in the resin material P in the molten state before retracting the movable part 12 to cause the resin material P to expand (see FIG. 3(a)). In this embodiment, as shown in FIG. 4(a), the inner peripheral surface of the hole Pa which is in contact with the outer peripheral surface of the pin 14 is cooled by contact with the pin 14, thereby forming a skin layer 25.

If the resin material P is caused to expand by retracting the movable part 12 with the skin layer 25 being formed on the inner peripheral surface of the hole, an area in the vicinity of the bottom of the skin layer 25 is broken and the hole Pa is enlarged, as shown in FIG. 4(b). Therefore, as shown in FIG. 4(c), on the inner peripheral surface of the hole 21 of the sound absorber 2 which is obtained by cooling and solidification of the resin material P, the skin layer 25 is formed on part of an area near the opening. The void layer 24 is caused to expose in an area nearer the bottom of the hole 21 than the skin layer 25.

It is preferred that the width "t" of the skin layer 25 in the hole 21 of the sound absorber 2 molded by the production process in this embodiment is within a range of 10 to 60% of the thickness of the final molded article (sound absorber).

Third Embodiment Of Production Process

Figure 5:
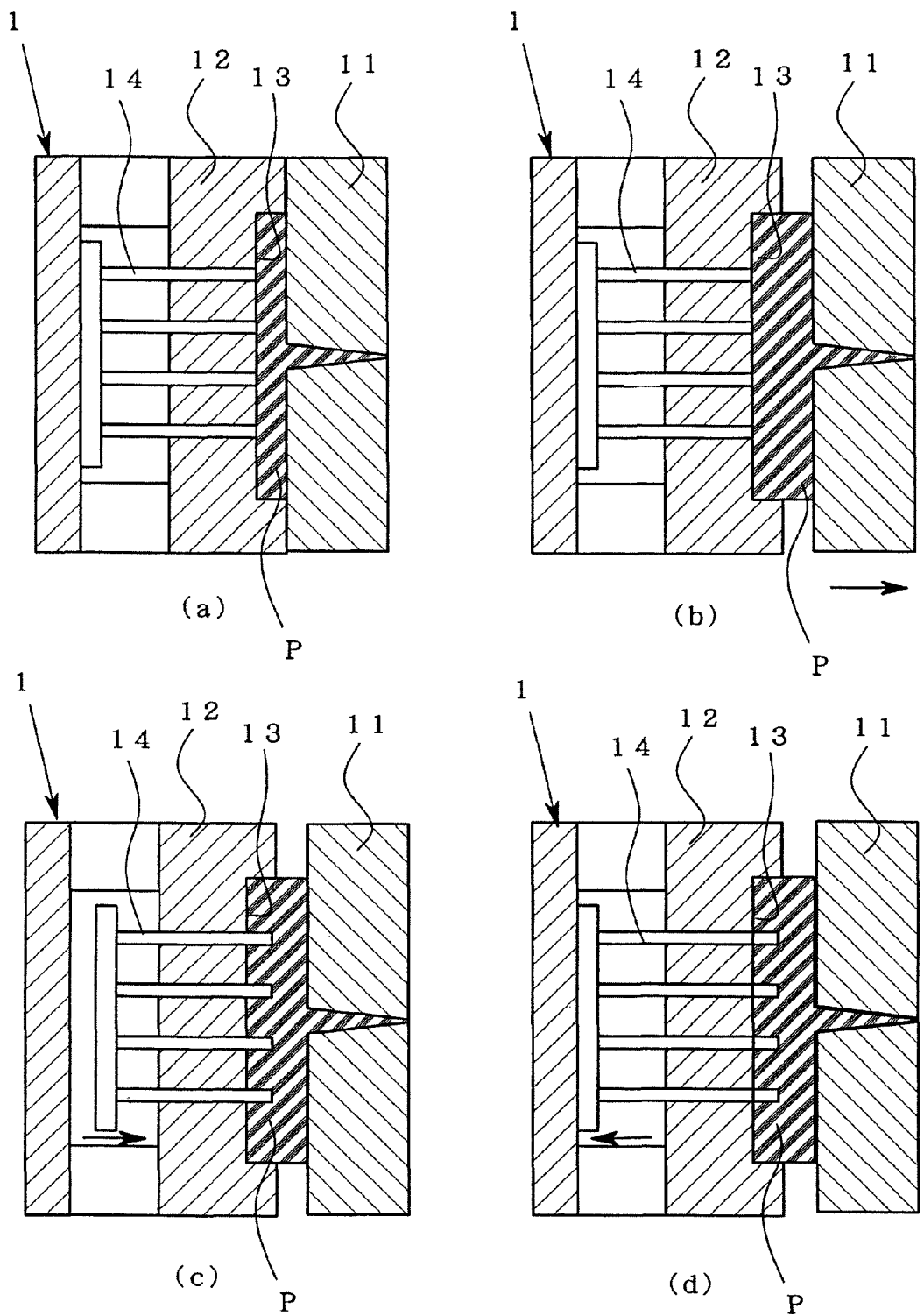
FIG. 5 is a schematic view showing the third embodiment of a process for producing the sound absorber of the invention.

The production process according to the third embodiment of the invention will be described below with reference to FIG. 5.

In this embodiment, after the resin material is injected into the cavity 13 after clamping as shown in FIG. 5(a), the movable part 12 is caused to retract to allow the resin material P to expand as shown in FIG. 5(b).

As shown in FIG. 5(c), before the resin material P in the cavity 13 is solidified, the pin 14 is advanced and caused to project into the cavity 13.

In this case, it is preferred that the projected part of the pin is long enough to penetrate one of the skin layers and is not long enough to reach the other skin layer. Preferably, the length of the projected part of the pin is 30 to 90% of the thickness of the final molded article (sound absorber).

The pin 14 is caused to retract with a prescribed timing as shown in FIG. 5(d).

The pin 14 is caused to retract, as explained in the first embodiment, before the resin material P which is in contact with the outer peripheral surface of the pin 14 is solidified and the skin layer is formed on the inner peripheral surface of the hole of the resin material P.

Figure 6:
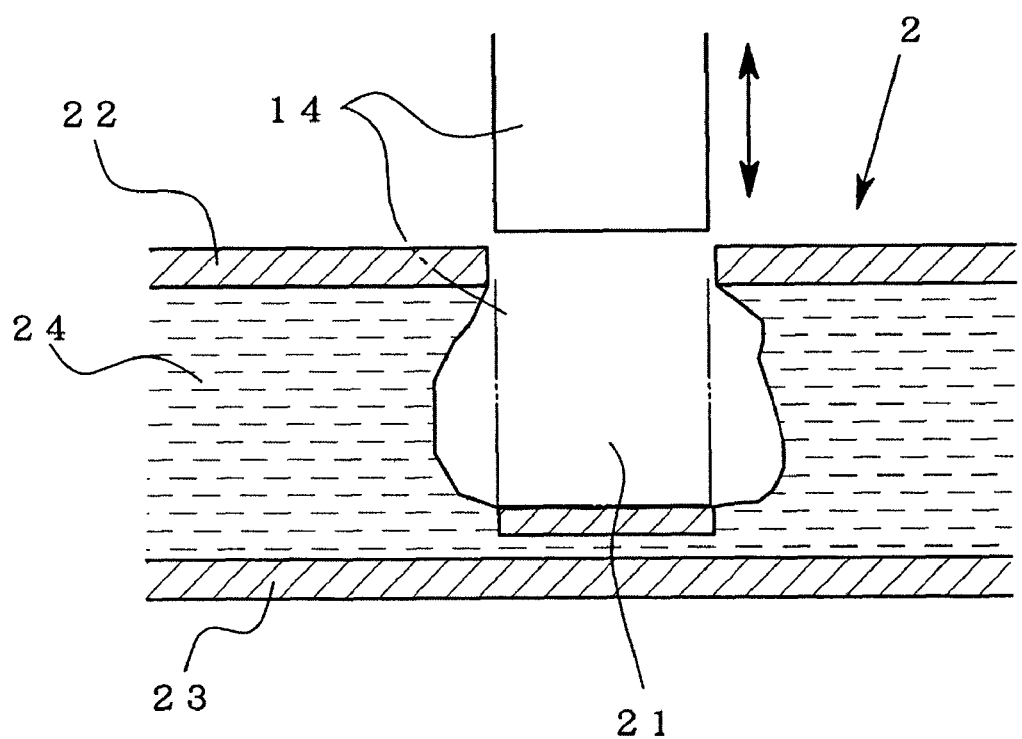
FIG. 6 is a cross-sectional view showing a hole part formed by the third embodiment of the invention.

FIG. 6 is a cross-sectional view of the hole of the sound absorber 2 molded according to the third embodiment. Inside the hole 21 which is formed by penetrating one of the skin layers 22 of the sound absorber 2, the void layer 24 is exposed entirely on the inner peripheral surface thereof.

In this embodiment, simultaneously with the formation of the other skin layer 22, the pin 14 is caused to project and push part of the skin layer 22 to the bottom of the hole. The void layer is crushed by this pushing action, and a space larger than the space formed in the first or second embodiment can be formed in the void layer present in the vicinity of the hole (see FIG. 6).

Embodiment Of Sound Absorbing Structure

The sound absorbers molded in the above-mentioned first to third embodiments can be used as a sound absorbing structure, for example, as a timing belt cover, an air cleaner cover, an air duct, an engine cover, a resonator for intake or ejection of air, an intake manifold, a shield panel for an engine room and a compartment, a trunk room, a ceiling material for an automobile, a door panel, or the like.

One embodiment of a sound absorbing structure is described below.

Figure 7:
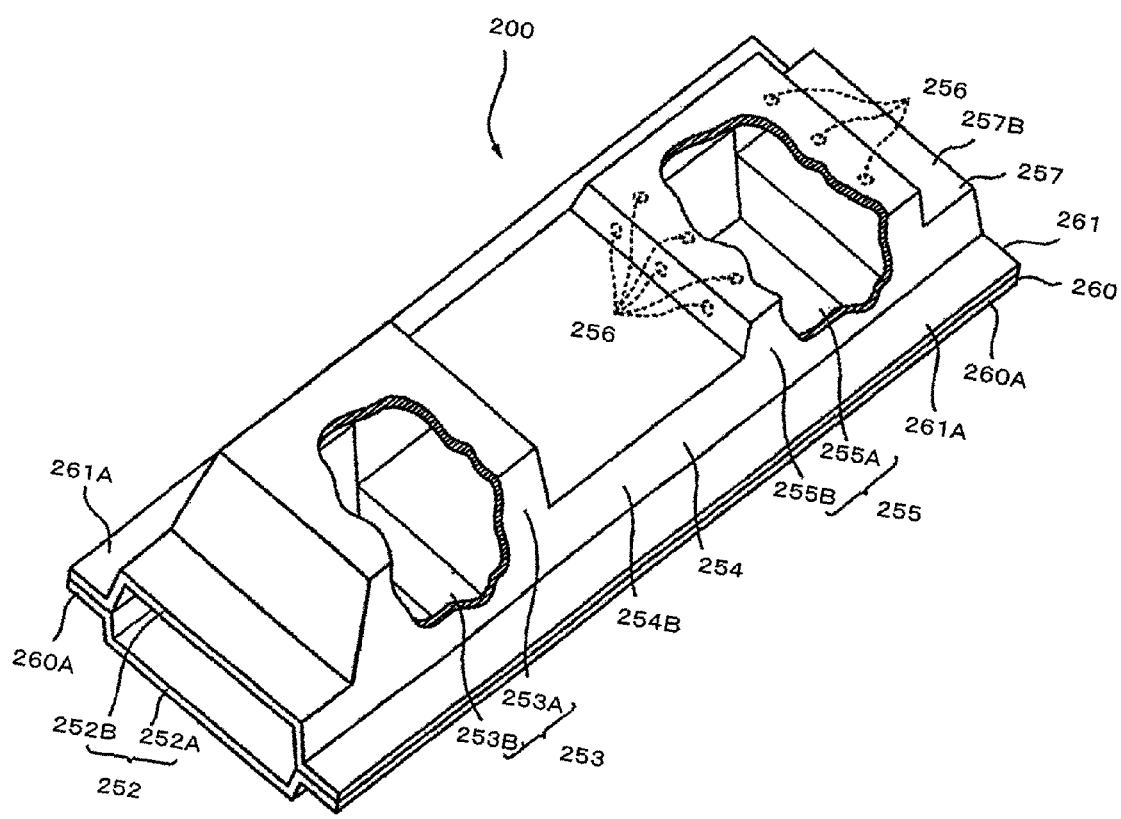
FIG. 7 is a partially-cutaway oblique view of an air intake apparatus according to one embodiment of a sound absorbing structure using the sound absorber of the invention.
Figure 8:
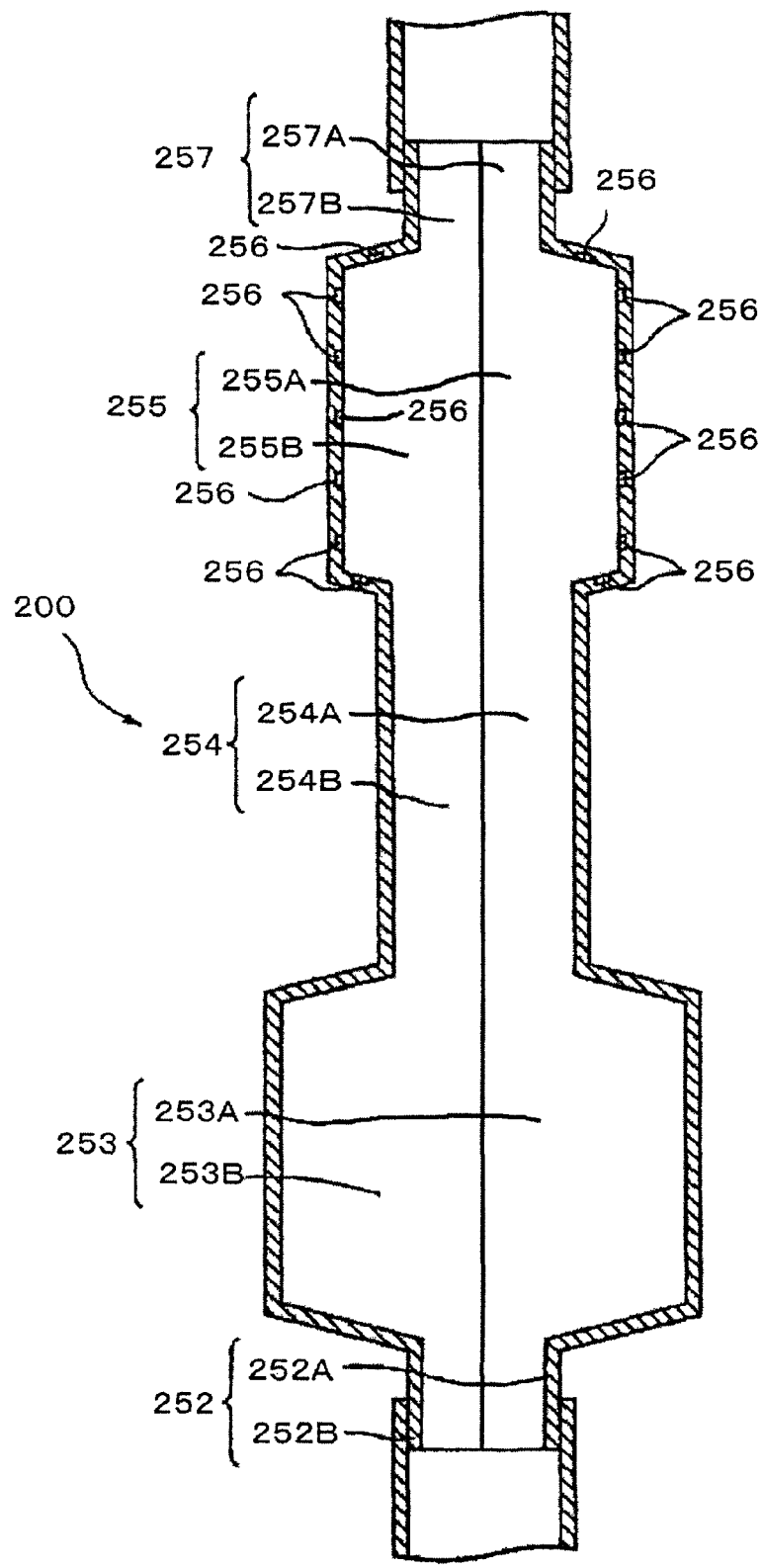
FIG. 8 is a cross-sectional view of the air intake apparatus shown in FIG. 7.

In FIGS. 7 and 8, an air intake apparatus 200 which is a sound absorbing structure is disposed on the air intake side of an internal combustion system such as an automobile engine (not shown).

The air intake apparatus 200 has an approximately cylindrical upstream fitting part 252.

In the air intake apparatus 200, an approximately cylindrical air cleaner 253 as an air cleaning part is provided in such a manner that it integrally continues to the upstream fitting part 252. The air cleaner 253 has, in its inside, a filter (not shown) having air permeability, for example. The filter transmits circulating air, and catches and separates dust which has mixed in the air. In the air intake apparatus 200, an approximately cylindrical duct part 254 is provided in such a manner that it integrally continues to the air cleaner 253. In the air intake apparatus 200, an approximately cylindrical resonator 255 is provided as a resonating part in such a manner that it integrally continues to the duct part 254. The resonator 255 absorbs a sound by resonance, interference and so on.

A plurality of circular holes 256 opening toward inside is provided on the inner surface of the resonator 255. The holes 256 can be formed by any of the procedures explained in the above-mentioned first to third embodiments.

The hole 256 has a cross sectional area of 0.785 to 314 mm$^2$. The holes 256 are provided with a pitch of 1 mm or more, preferably 10 mm or more and 200 mm or less. The inner and outer peripheral surfaces of the resonator 255 do not pass through the hole 256 continuously. The inner diameter of the hole 256 is within a range of 1 to 20 mm.

If the inner diameter of the hole 256 is smaller than 1 mm, interference of a noise by the hole 256 is insufficient, and sufficient sound absorbing properties may not be obtained. If the inner diameter of the hole exceeds 20 mm, strength may lower to damage the apparatus during production, assembling, or in use.

Further, in the air intake apparatus 200, an approximately cylindrical downstream fitting part 257 is provided in such a manner that it integrally continues to the resonator 255. The downstream fitting part 257 is connected to the internal combustion system side.

The air intake apparatus 200 separates and removes dust in the air which is taken from the upstream fitting part 252 by an air cleaner 253. The air from which dust is removed by separation is flown into the resonator 255 through the duct part 254. After sound is absorbed, the air is supplied from the downstream fitting part 257 to the internal combustion system.

A lower module half piece 260 and an upper module half piece 261 which has an approximately symmetric shape with the lower module half piece 260 are integrally connected to be in an approximate cylindrical form.

The lower module half piece 260 has an approximately box-shaped lower air cleaner part 253A which opens upwardly to an expansively opening state. On one edge in the longitudinal direction of the lower air cleaner part 253A, a bucket-shaped lower upstream fitting part 252A is provided in such a manner that it integrally continues to the lower air cleaner part 253A and opens upwardly. On the other edge in the longitudinal direction of the lower air cleaner part 253A, a bucket-shaped lower duct part 254A which has a shape approximately similar to that of the lower upstream fitting part 252A is provided in such a manner that it integrally continues to the lower air cleaner part 253A and opens upwardly.

In the lower module half piece 260, a lower resonance part 255A is provided in such a manner that it integrally continues to the lower duct part 254A. Like the lower air cleaner part 253A, the lower resonance part 255A is formed in an approximate box shape and opens upwardly in an expansively opening state. In the lower resonance part 255A, a plurality of holes 256 opening downwardly are provided on the lower surface which constitutes the outer surface.

A lower downstream fitting part 257A is provided in such a manner that it integrally continues to the other edge of the lower resonance part 255A of the lower module half piece 260. The lower downstream fitting part 257A is formed in a shape approximately similar to that of the lower upstream fitting part 252A, e.g. in the shape of a bucket which opens upwardly.

On the upper edge of the lower module half piece 260, a flange-like lower connection half piece 260A which protrudes in the outer peripheral direction is provided continuously along the upper both edges of a lower upstream fitting part 252A, a lower air cleaner part 253A, a lower duct part 254A, a lower resonance part 255A, and a lower downstream fitting part 257A.

On the other hand, the upper module half piece 261 is formed in a shape approximately similar to the lower module half piece 260. In the upper module half piece 261, an upper upstream fitting part 252B corresponding to the lower upstream fitting part 252A, an upper air cleaner part 253B corresponding to the lower air cleaner part 253A, a lower duct part 254B corresponding to the lower duct part 254A, an upper resonance part 255B corresponding to the lower resonance part 255A, and an upper downstream fitting part 257B corresponding to the lower downstream fitting part 257A are formed in sequence integrally and continuously. In the upper module half piece 261, a flange-like upper connection piece half 261A corresponding to a lower connection half 260A is provided in a shape approximately similar to that of the lower connection half piece 260A.

The lower module half piece 260 and the upper module half piece 261 are formed by injection molding using a predetermined raw material. The predetermined raw material is the same as the above-mentioned resin material.

The lower module half piece 260 and the upper module half piece 261 is formed to have a porous structure in which a number of voids, namely, minute pores in foaming state, are formed in the cross section thereof. In other words, the lower module half piece 260 and the upper module half piece 261 each have a cross sectional structure in which two skin layers and a void layer, having a number of voids, being interposed between these skin layers are provided.

In the air intake apparatus 200, the lower connection half piece 260A of the lower module half piece 260 and the upper connection half piece 261A of the upper module half piece 261 are welded by, for example, by vibration welding such that the opening surfaces of the lower module half piece 260 and the upper module half piece 261 are opposed to each other, i.e., the upper surface of the lower module half piece 260 is covered by the lower surface of the upper module half piece 261.

In the air intake apparatus 200, by the connection of the lower module half piece 260 and the upper module part 261, the lower upstream fitting part 252A of the lower module half piece 260 and the upper upstream fitting part 252B of the upper module half piece 261 constitute the upper upstream fitting part 252. The air cleaner 253 is composed of the lower air cleaner part 253A of the lower module half piece 260 and the upper air cleaner part 253B of the upper module half piece 261. The duct part 254 is composed of the lower duct part 254A of the lower module half piece 260 and the upper duct part 254B of the upper module half piece 261.

The resonator 255 is composed of the lower resonator part 255A of the lower module half piece 260 and the upper resonator part 255B of the upper module half piece 261. Further, the downstream fitting part 257 is composed of the lower downstream fitting part 257A of the lower module half piece 260 and the upper downstream fitting part 257B of the upper module half piece 261. The air intake apparatus 200 is molded into an approximately cylindrical shape in which the upstream fitting part 252, the air cleaner 253, the duct part 254, the resonator 255, and the downstream fitting part 257 are sequentially communicated.

The above-mentioned process for producing the air intake apparatus 200 will be described with reference to the drawings. The raw material used is the same as the resin material mentioned above.

Figure 9:
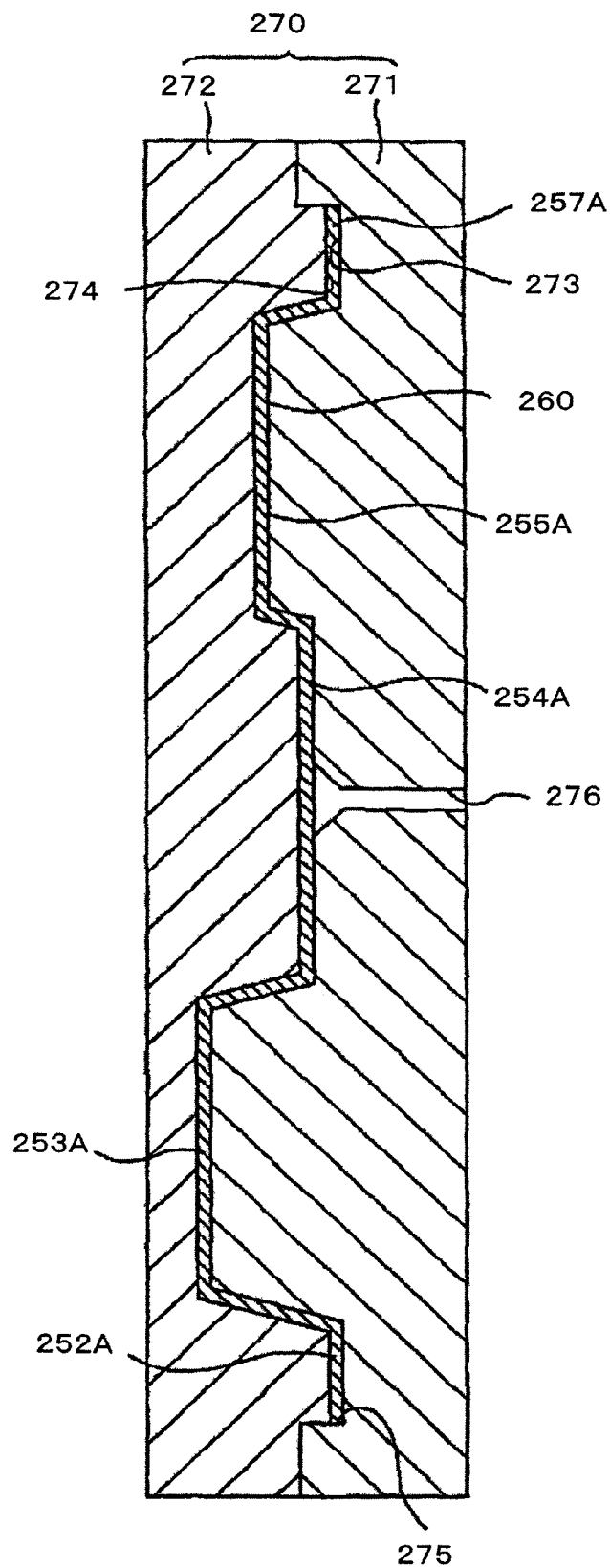
FIG. 9 is a view showing a manner in which a module piece of the air intake apparatus is molded by a mold.

The raw material prepared is molten and injected into a mold 270, as shown in FIG. 9. The mold 270 has frames 271 and 272 composed of a movable part and a fixed part. On the surfaces opposing to the frames 271 and 272, the recesses 273 and 274 from which the raw material is injected are formed. The mold 270 formed by connecting a pair of frames 271 and 272 constitutes, in each of the recesses 273 and 274, a molding space 275 as a cavity corresponding to the shape of halves, i.e., the lower module half piece 260 and the upper module half piece 261. In one of the frames 271, a gas injecting hole 276 is provided to inject gas into the molding space 275.

In the injection molding in which the raw material is injected to the mold 270, each of the raw materials is supplied to an injection apparatus (not shown), plasticized and melt-kneaded to a molten state where the raw materials are dispersed almost uniformly. The raw materials are injected into the molding space 275 of the mold 270. The uppermost surfaces of the injected raw materials which are in contact with the molding surface which constitutes the inner surface of the recesses 273 and 274 of the frames 271 and 272 are cooled to solidify faster than the interior of the injected raw materials, whereby a skin layer (not shown) is formed.

Using for example a gas supply apparatus (not shown), a gas such as air or carbon dioxide is supplied to the molten raw materials from the gas supply hole 276 at high temperatures and high pressures. Due to the supply and penetration of the gas in the supercritical state, a countless number of air bubbles are formed. Subsequently, the raw material is cooled for a prescribed time to solidify. The lower module half piece 260 and the upper module half piece 261 are formed by solidification of the raw materials. At this time, as mentioned in the first to third embodiments, a plurality of holes 256 are formed by the pin (not shown) disposed in the mold 270.

It is preferred that, of the angles formed by the traveling direction of an acoustic wave and the surface of the skin layer, a smaller one is 60 to 90 degrees. If the angle formed by traveling direction of an acoustic wave and the surface of the skin layer is less than 60 degrees, the acoustic wave does not enters the hole, and as a result, sufficient absorbing properties may not be developed.

As for the upper module half piece 260 and the lower module half piece 261 thus formed, the opposing surfaces of these module halves are faced to each other. The lower connection half piece 260A of the lower module half piece 260 and the upper connection half piece 261A of the upper module half piece 261 are welded by vibration welding, whereby the lower module half piece 260 and the upper module half piece 261 are connected integrally.

The above mentioned embodiments of the invention have the following effects.

(1) The skin layer and the void layer are provided, and the skin layer has sound insulating properties and the void layer has sound absorbing properties due to the presence of a number of voids inside. Therefore both sound absorbing properties and sound insulating properties can be obtained by integral molding without the need of laminating a plurality of materials.

(2) A plurality of holes 256 communicating with the skin layer and the void layer are formed at arbitral locations of the molded article. Due to the morphology of the holes 256 described in the first to third embodiments, a sound with an arbitral frequency can be absorbed selectively. As a result, an uncomfortable sound can be absorbed selectively.

(3) Since the holes 256 are formed inside the cylindrical air intake apparatus 200, the air intake apparatus 200 which is required to absorb a sound inside the apparatus can be produced easily.

(4) The holes 256 can be formed easily at a low cost since molding of the halves (lower module half piece 260 and upper module half piece 261) and forming of the holes 256 can be performed simultaneously.

(5) Due to the use of vibration welding, the halves (lower module half piece 260 and upper module half piece 261) can be welded firmly without causing shifting of contact surfaces. As a result, development of sound absorbing properties can be ensured.

EXAMPLES

The examples of the invention will be described. In the examples, a sound absorber was molded by the process in the first embodiment (Example 1), the process in the second embodiment (Example 2), and the process in the third embodiment (Example 3). Measurement was conducted for the molded absorbers.

Figure 10:
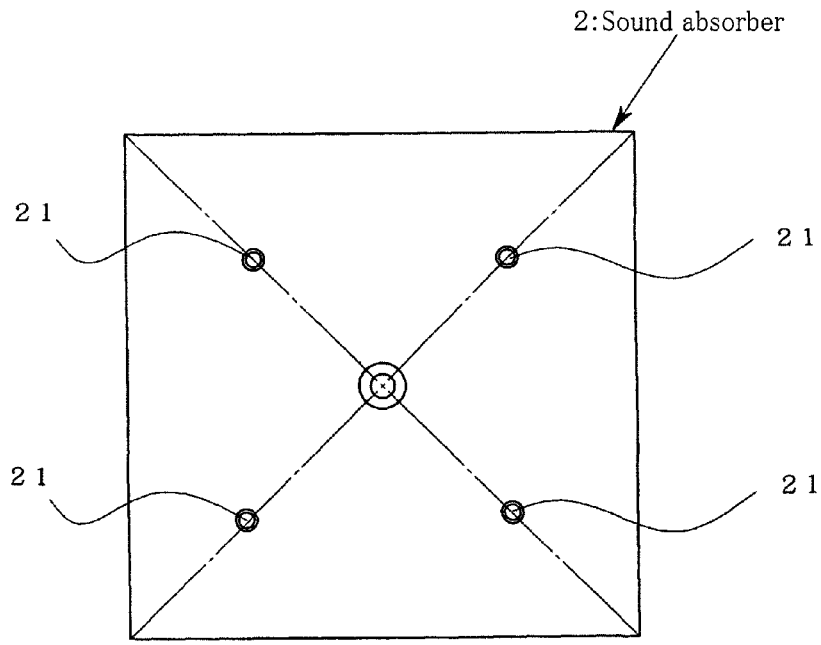
FIG. 10 is a plan view showing a sound absorber and holes to be formed in the examples of the invention.

Conditions for molding are as follows.
(1) Resin material: A glass fiber-containing polypropyrene (Idemitsu Mostron L: length 8 mm, GF content: 20%) to which 3 wt % of the foaming agent was added.
(2) Mold: Same as that shown in FIG. 1. A pin was allowed to be heated by a heater.
(3) Shape of a molded article: A 180 mm-square in the plan state. The initial thickness was 3 mm and the final thickness was 9 mm (expanded by three times). The thickness of the skin layer was 0.6 mm (one side).
(4) Shape and location of holes: Two types were provided. One is that four circular holes 21 with a diameter of 6 mm and a depth of 8 mm were formed on positions dividing the two diagonal line of the sound absorber 2 roughly into four equal parts, as shown in FIG. 10. Another is that four circular holes 21 with a diameter of 10 mm and a depth of 8 mm were formed on positions dividing the two diagonal line of the sound absorber 2 roughly into four equal parts, also as shown in FIG. 10. The sound absorbing properties were evaluated for each.
(5) Molding conditions: A sound absorber was obtained by molding at the following conditions:

Molding temperature: 230° C.
Temperature of mold: 30° C.
Filling time: 1 second
Timing of starting retraction of movable part: 3 seconds after completion of filling
Speed of retraction of movable part: 2 mm/sec
Cooling time: 60 seconds (6) Results Sound absorbers obtained in the examples were compared with a comparative sound absorber in which the skin layer was formed entirely on the inner peripheral surface of the hole and the void layer was not exposed in the inner peripheral surface of the hole. The sound absorption rate was measured by the vertical incidence sound absorption judgment of the pipe method according to JIS A1405.

The condition and the sound absorption effect in each example were as follows. Results of the measurement of the sound absorption rate are shown in the following table and the graph of FIG. 11.

Example 1

Figure 12:
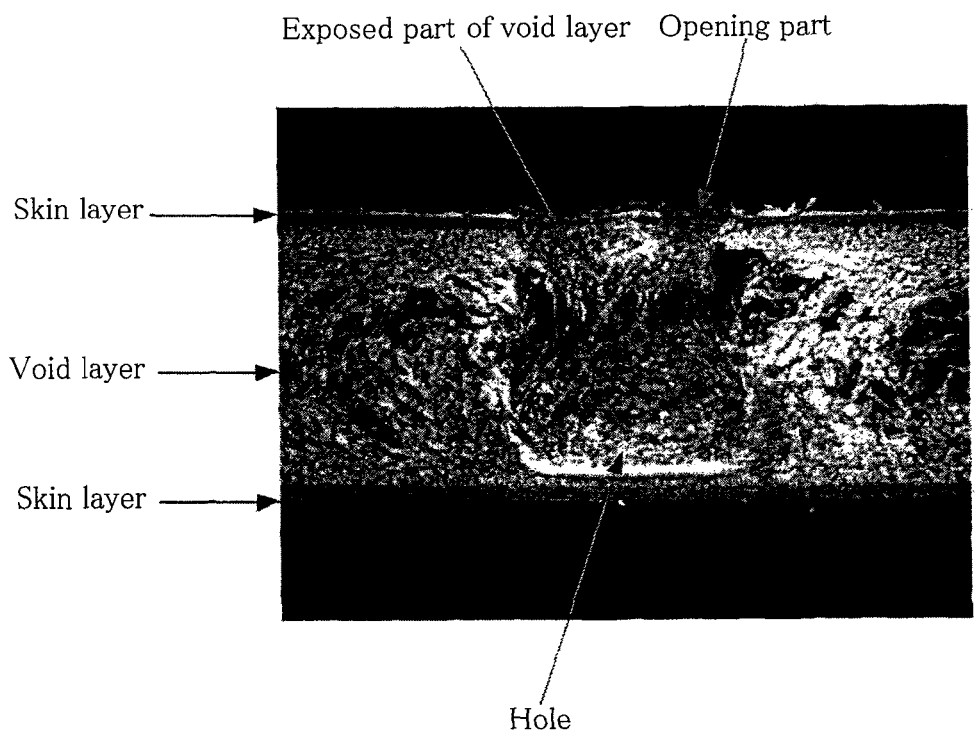
FIG. 12 is a photograph showing a cross section of a hole part of a sound absorber produced by the process in the first embodiment of the invention.

No skin layer was formed on the hole wall, and a skin layer was exposed (see FIG. 12). Sound absorbing effects were observed, and a sound absorption frequency could be changed by varying the diameter of the hole.

Example 2

Figure 13:
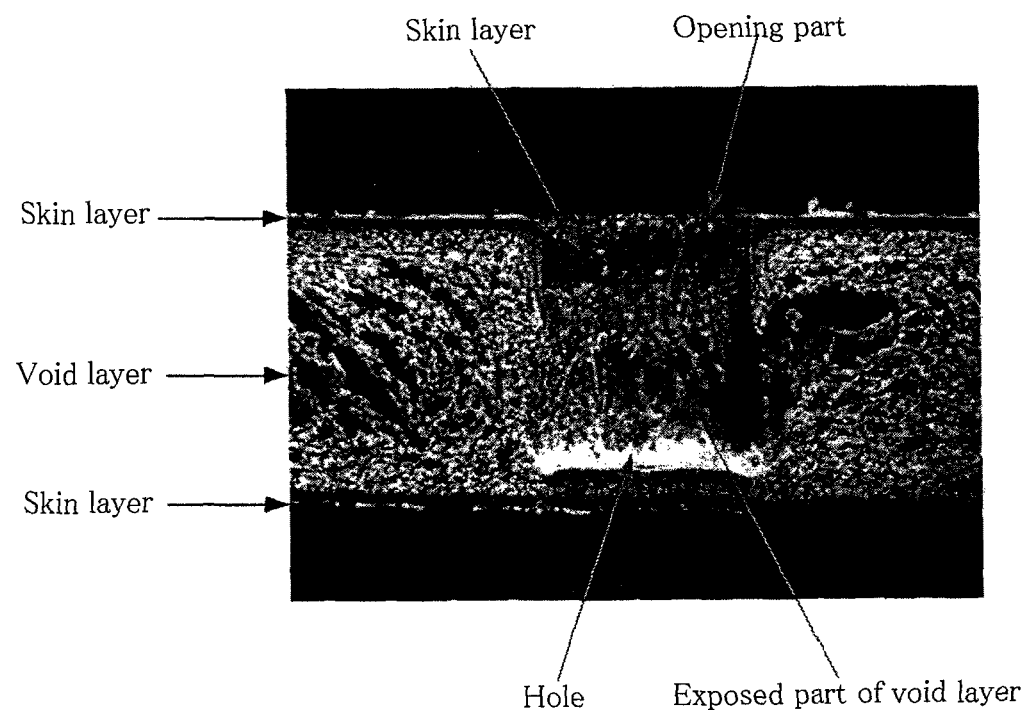
FIG. 13 is a photograph showing a cross section of a hole part of a sound absorber produced by the process in the second embodiment of the invention.

The hole wall near the opening part was covered by a skin layer, and a void layer was exposed near the bottom (see FIG. 13). Sound absorbing effects were observed, and a sound absorption frequency was shifted to a lower frequency side as compared with Example 1 although the hole diameter remained the same.

Example 3

Figure 14:
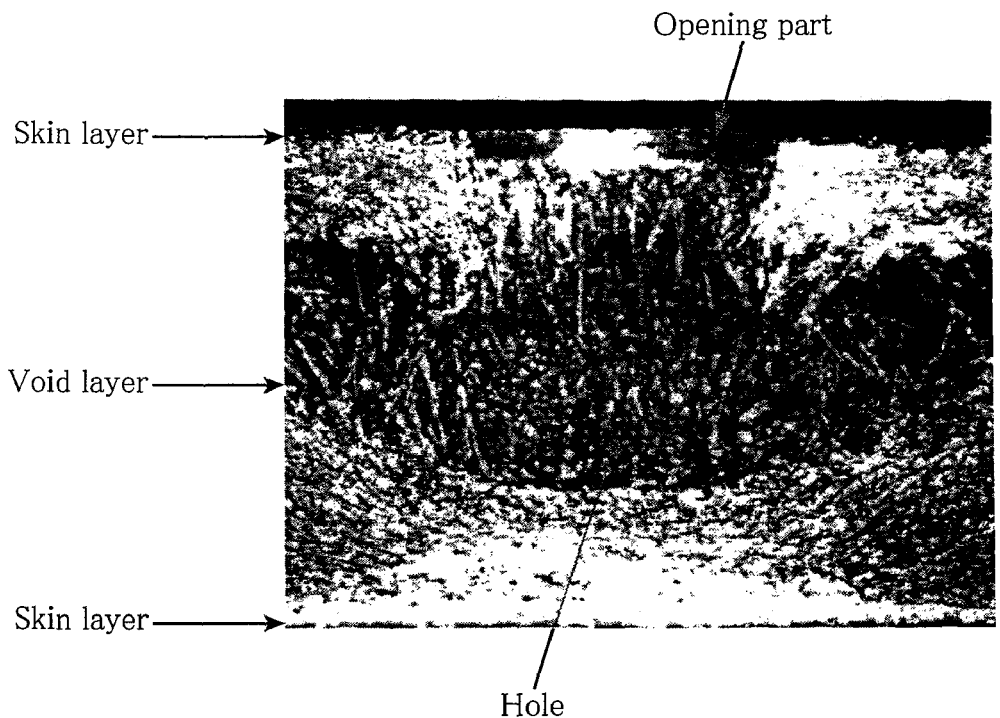
FIG. 14 is a photograph showing a cross section of a hole part of a sound absorber produced by the process in the third embodiment of the invention.

A void layer was crushed and a relatively large space was formed inside (see FIG. 14). Sound absorbing effects were observed and the sound absorption rate higher than that obtained in Example 1 was obtained.

Comparative Example

Figure 15:
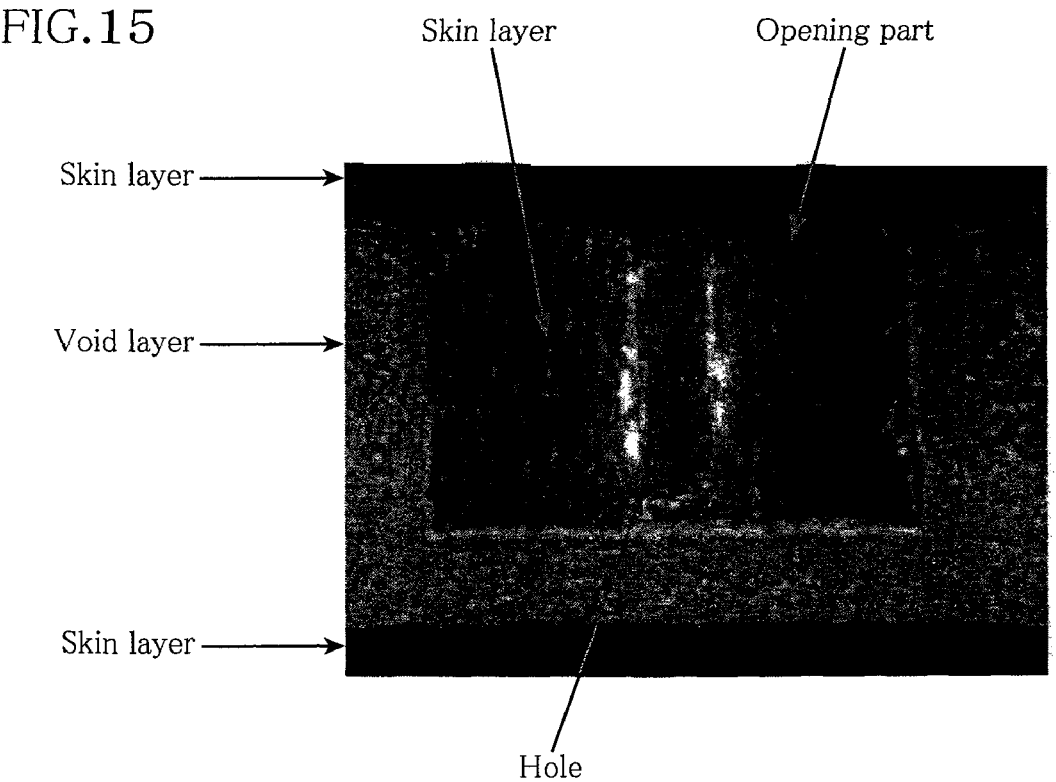
FIG. 15 is a cross-sectional view of a hole part of a sound absorber in the comparative example.

A skin layer was formed entirely on the inner peripheral surface of the hole, and a void layer was not exposed (see FIG. 15). No sound absorbing effects were observed.

TABLE 1

| | Timing of projecting pin (sec) | Time during which pin is kept projected (sec) | Heating of pin | Morphology of cross section of hole | Hole diameter 6 mm | | Hole diameter 10 mm | |
| --- | --- | --- | --- | --- | --- | --- | --- | --- |
| | | | | | Sound absorbing frequency (Hz) | Sound absorption rate (%) | Sound absorbing frequency (Hz) | Sound absorption rate (%) |
| Example 1 | 2 | 5 | Heated | FIG. 12 | 620 | 33 | 980 | 37 |
| Example 2 | 0 | 5 | Not heated | FIG. 13 | 560 | 32 | 900 | 35 |
| Example 3 | 8 | 5 | Not heated | FIG. 14 | 620 | 39 | 980 | 42 |
| Comparative Example | 1 | 20 | Not heated | FIG. 15 | — | 2 | — | 2 |

Timing of projecting a pin is expressed as a time lapsed after the start of filling.

Figure 11:
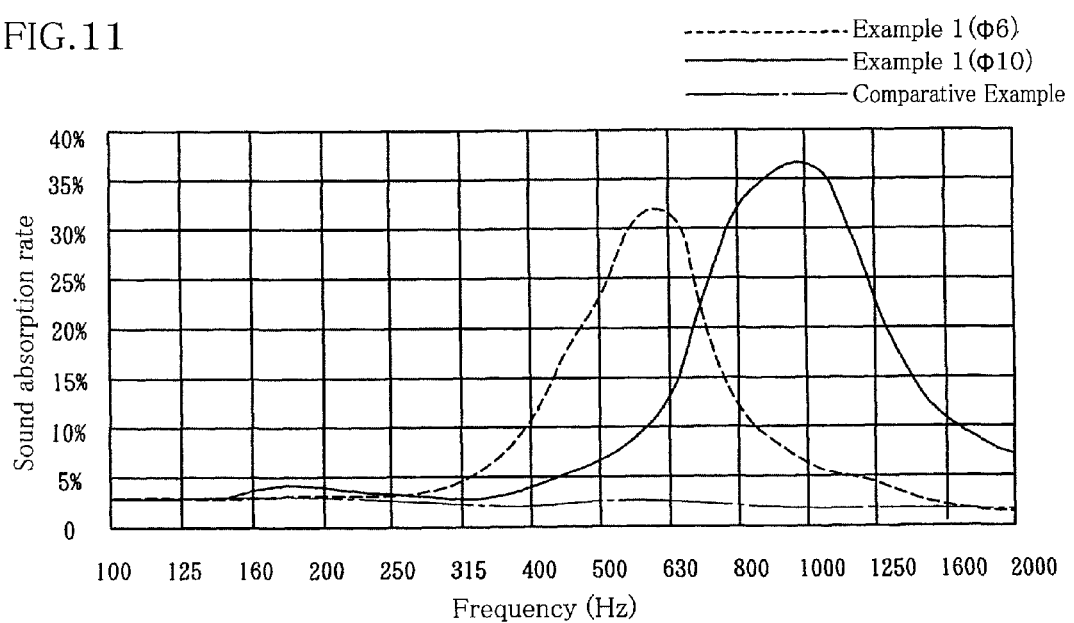
FIG. 11 is a graph showing sound absorption rates measured in the examples of the invention.

As is apparent from the graph in FIG. 11, the sound absorber in Example 1 exhibited excellent sound absorbing effects, for example, the sound absorber with 6 mm-diameter holes exhibited sound absorbing effects in a frequency band of about 620 Hz and the sound absorber with 10 mm-diameter holes exhibited sound absorbing effects in a frequency band of about 980 Hz.

In the invention, it is possible to provide the hole obtained by the process in the above-mentioned first to third embodiments may be provided singly or in combination, and to change the targeted sound absorption frequency range by changing variously the number and location of the holes and the width of the skin layer formed on the inner peripheral surface of the hole.

The preferred embodiments of the invention were described above. The above-mentioned embodiments are not construed as limiting the scope of the invention.

For example, in the above description, the pin 14 was described as one which is disposed in the movable part. However, the pin 14 may be disposed in the fixed part.

In the first and second embodiments, the pin 14 was described as one which is caused to project immediately after injecting the resin material P in the cavity 13. However, the pin 14 may be caused to project before or simultaneously with injecting the resin material P in the cavity 13. Further when the pin 14 is caused to project after injecting the resin material, the pin 14 may be caused to project before or after the expansion of the resin material P by retracting the movable part 12. It is also possible to cause the pin 14 to project simultaneously with the expansion of the resin material by synchronizing with the retraction of the movable part 12.

The above description is made on the preposition that the resin material is expansible. The invention can be applied to molding of a non-expansible resin material.

INDUSTRIAL APPLICABILITY

In addition to the above-mentioned air cleaner, air duct, and resonator for intake and ejection of air, the sound absorber obtained by the production process of the invention can be used for a cylinder head, a timing belt cover, an engine cover, an intake manifold, an insulator panel between an engine room and a compartment, a trunk room, a hood, a ceiling material of an automobile, a door panel, or the like.

The invention claimed is:

1. A sound absorber comprising:
    rigid skin layers constituting front and back surfaces;
    interposed between the skin layers, a void layer having a number of voids; and
    a plurality of pin formed holes extending through one of the rigid skin layers and into the void layer, each of the holes having a depth which is enough to penetrate the one of the rigid skin layers and is not enough to reach the other rigid skin layer, wherein a rigid skin layer is formed on a part of the inner peripheral surface of at least one of said holes,
    wherein the sound absorber is formed of a resin material containing 2 to 60 wt % of reinforcing fibers with a length of 2 to 100 mm.

2. The sound absorber according to claim 1, wherein an expansible material is used as the resin material.

3. A sound absorbing structure containing the sound absorber according to claim 1, wherein the sound absorber structure is used for any one of an air cleaner, an air duct, and a resonator for intake or ejection of air.

4. The sound absorber according to claim 1, wherein the reinforcing fibers are glass fibers.

5. The sound absorber according to claim 1, wherein the skin layer has characteristics distinguishable from the void layer.

6. The sound absorber according to claim 1, wherein the skin layer is formed on the entire inner peripheral surface of at least one of said holes.

* * * * *